(12) United States Patent
Sugo et al.

(10) Patent No.: US 7,781,541 B2
(45) Date of Patent: Aug. 24, 2010

(54) POLYIMIDE SILICONE RESIN AND THERMOSETTING COMPOSITION COMPRISING THE SAME

(75) Inventors: Michihiro Sugo, Annaka (JP); Hideto Kato, Takasaki (JP); Tomoyuki Goto, Annaka (JP); Shohei Tagami, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 627 days.

(21) Appl. No.: 11/705,784

(22) Filed: Feb. 14, 2007

(65) Prior Publication Data
US 2007/0197680 A1    Aug. 23, 2007

(30) Foreign Application Priority Data
Feb. 15, 2006   (JP) .............................. 2006-037844

(51) Int. Cl.
C08G 77/455    (2006.01)
C08L 83/04     (2006.01)
(52) U.S. Cl. ............................. 525/476; 528/26; 528/28
(58) Field of Classification Search ...................... None
See application file for complete search history.

(56) References Cited

U.S. PATENT DOCUMENTS

| | | | | |
|---|---|---|---|---|
| 4,404,350 | A * | 9/1983 | Ryang | 528/26 |
| 4,794,153 | A | 12/1988 | Rich | |
| 4,795,680 | A * | 1/1989 | Rich et al. | 428/450 |
| 5,104,958 | A * | 4/1992 | Bolon et al. | 528/26 |
| 5,258,487 | A | 11/1993 | Okinoshima et al. | |
| 5,677,393 | A * | 10/1997 | Ohmori et al. | 525/423 |
| 6,887,580 | B2 * | 5/2005 | Tokuhisa et al. | 428/473.5 |
| 2004/0105990 | A1 * | 6/2004 | Shiobara et al. | 428/473.5 |
| 2006/0079658 | A1 * | 4/2006 | Kato et al. | 528/43 |

FOREIGN PATENT DOCUMENTS

| | | | |
|---|---|---|---|
| GB | 2 224 742 A | | 5/1990 |
| JP | 5-125334 A | * | 5/1993 |
| JP | 6-200216 A | | 7/1994 |
| JP | 10-195278 A | | 7/1998 |

OTHER PUBLICATIONS

Machine translation of JP 5-125334.*
Abstract for JP 5-32762 A (1993).*

* cited by examiner

Primary Examiner—Marc S Zimmer
(74) Attorney, Agent, or Firm—Birch, Stewart, Kolasch & Birch, LLP

(57) ABSTRACT

A polyimide silicone resin, characterized in that the polyimide silicone resin comprises repeating units represented by the following formula (1) and has a number average molecular weight of from 5,000 to 200,000

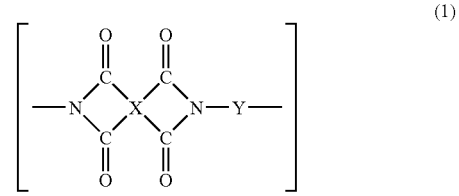

wherein X is a tetravalent organic group, at least one of the tetravalent organic groups being represented by the following formula (2)

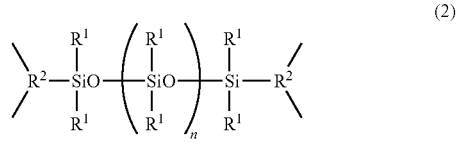

wherein $R^1$ may be the same with or different from each other and is a monovalent hydrocarbon group having 1 to 8 carbon atoms, $R^2$ may be the same with or different from each other and is a trivalent organic group, and n ranges from 1 to 120 on average, and Y is a divalent organic group, at least one of the divalent organic groups comprising a phenolic hydroxyl group or a carboxyl group bonded to an aromatic ring.

12 Claims, 6 Drawing Sheets

POLYIMIDE SILICONE RESIN AND THERMOSETTING COMPOSITION COMPRISING THE SAME

CROSS REFERENCES

This application claims benefit of Japanese Patent application No. 2006-037844 filed on Feb. 15, 2006, the contents of which are hereby incorporated by reference.

FIELD OF THE INVENTION

The present invention relates to a polyimide silicone resin, specifically to a polyimide silicone resin comprising a phenolic hydroxyl group and/or a carboxyl group bonded to an aromatic ring. The present invention relates also to a composition comprising the polyimide silicone resin.

BACKGROUND OF THE INVENTION

A polyimide resin comprising a phenolic hydroxyl group and/or a carboxyl group has good reactivity, so that has been attracts much interest. For example, Japanese Patent Application Laid-Open No. 6-200216 and Japanese Patent No. 3329677 describe a polyimide silicone comprising a phenolic hydroxyl group.

It is described that the polyimide silicone has good heat resistance, chemical resistance, and electrical insulating property to be used for applications such as protective or electrical insulating layer and cover-lay film for semiconductor devices, multilayer printed wiring board and soldered parts.

The aforesaid properties such as heat resistance can be improved by increasing an amount of the phenolic hydroxyl group and/or carboxyl group. However, such a polyimide silicone resin will shrink more when cured and lose flexibility, causing warpage of a substrate encapsulated with the polyimide silicone resin.

SUMMARY OF THE INVENTION

An object of the present invention is to provide a polyimide resin whose cured product has not only good heat resistance but also flexibility.

Thus, the present invention is a polyimide silicone resin, characterized in that the polyimide silicone resin comprises repeating units represented by the following formula (1) and has a number average molecular weight of from 5,000 to 200,000

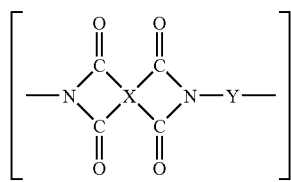
(1)

wherein X is a tetravalent organic group, at least one of the tetravalent organic groups being represented by the following formula (2)

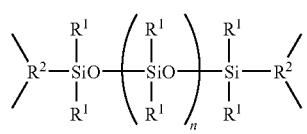
(2)

wherein $R^1$ may be the same with or different from each other and is a monovalent hydrocarbon group having 1 to 8 carbon atoms, $R^2$ may be the same with or different from each other and is a trivalent organic group, and n ranges from 1 to 120 on average, and Y is a divalent organic group, at least one of the divalent organic groups comprising a phenolic hydroxyl group or a carboxyl group bonded to an aromatic ring.

The present polyimide silicone resin has good reactivity and forms a cured product which adheres strongly to a substrate and is chemically resistant. The cured produce is flexible, so that it can release stress. The polyimide silicone resin is advantageously used for protective coatings for electric, electrical, and semiconductor devices.

PREFERRED EMBODIMENTS OF THE INVENTION

Figure 1:
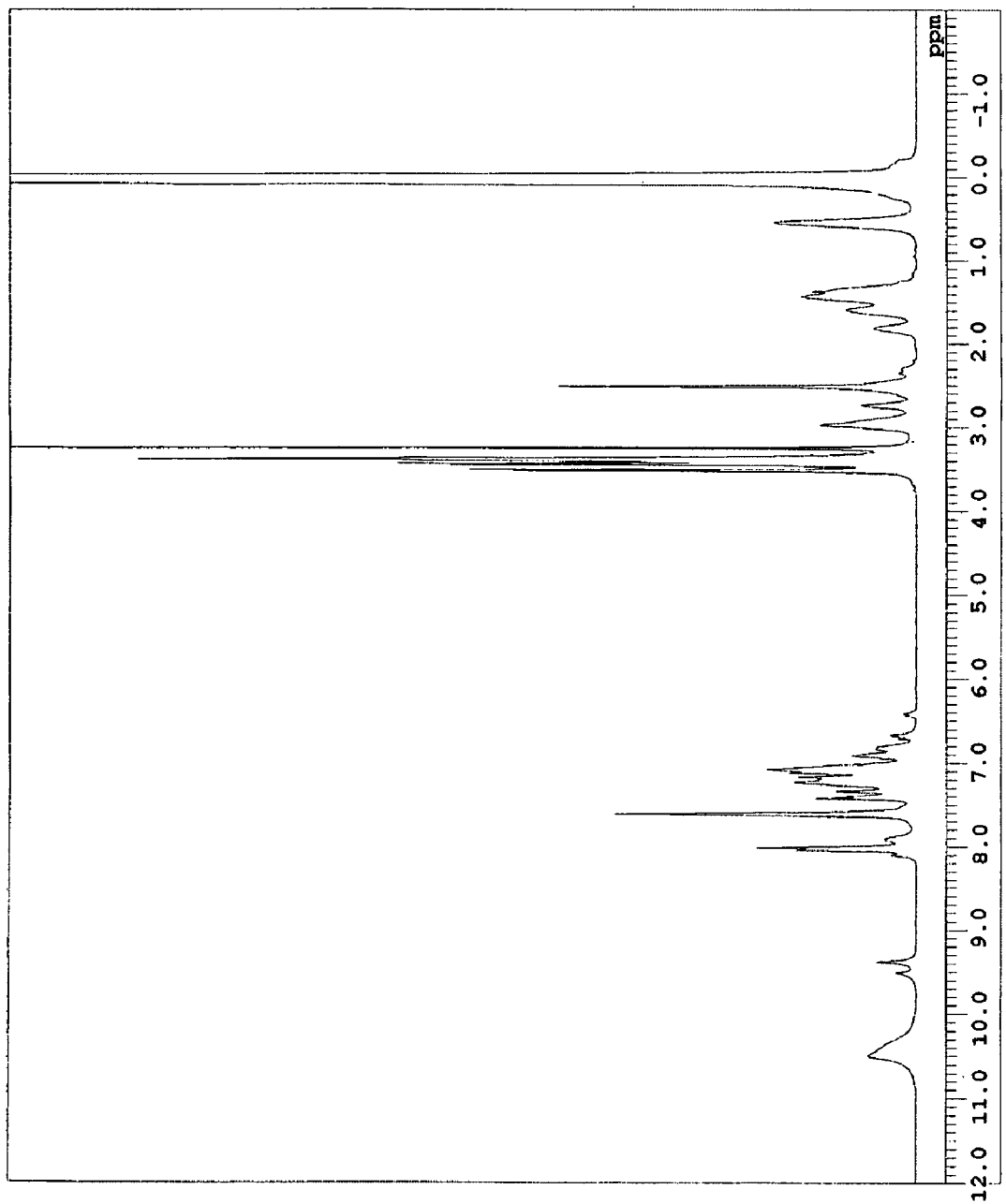
FIG. 1 is a $^1$H-NMR chart of the polyimide silicone prepared in Example 1.

The present polyimide silicone resin is characterized in that at least one of X is a silicone residue represented by the above formula (2). With the silicone residue, a cured product of the present polyimide silicone is flexible. In the formula (2), $R^1$ is a monovalent hydrocarbon group having 1 to 8 carbon atoms, which may be different among a plurality of $R^1$'s. Examples of $R^1$ include alkyl groups such as methyl, ethyl, propyl, butyl, pentyl and hexyl groups; alicyclic groups such as cyclopentyl, and cyclohexyl groups; aryl groups such as a phenyl group; aralkyl groups such as benzyl, and phenetyl groups; alkenyl groups such as vinyl, allyl, propenyl, isopropenyl, and butenyl groups; and a mixture thereof. Among these, methyl, ethyl, phenyl and vinyl groups are preferred because of availability of raw materials.

In the formula (2), $R^2$ may be derived from alkylsuccinic anhydride such as propylsuccinic acid anhydride, norbornyl acid anhydride, propylnadic acid anhydride, or phthalic acid anhydride, among which alkylsuccinic anhydride, particularly propylsuccinic acid anhydride, is preferred. In the formula (2), n is an integer of from 1 to 120, preferably from 3 to 80, more preferably from 5 to 50.

Examples of X are as shown below.

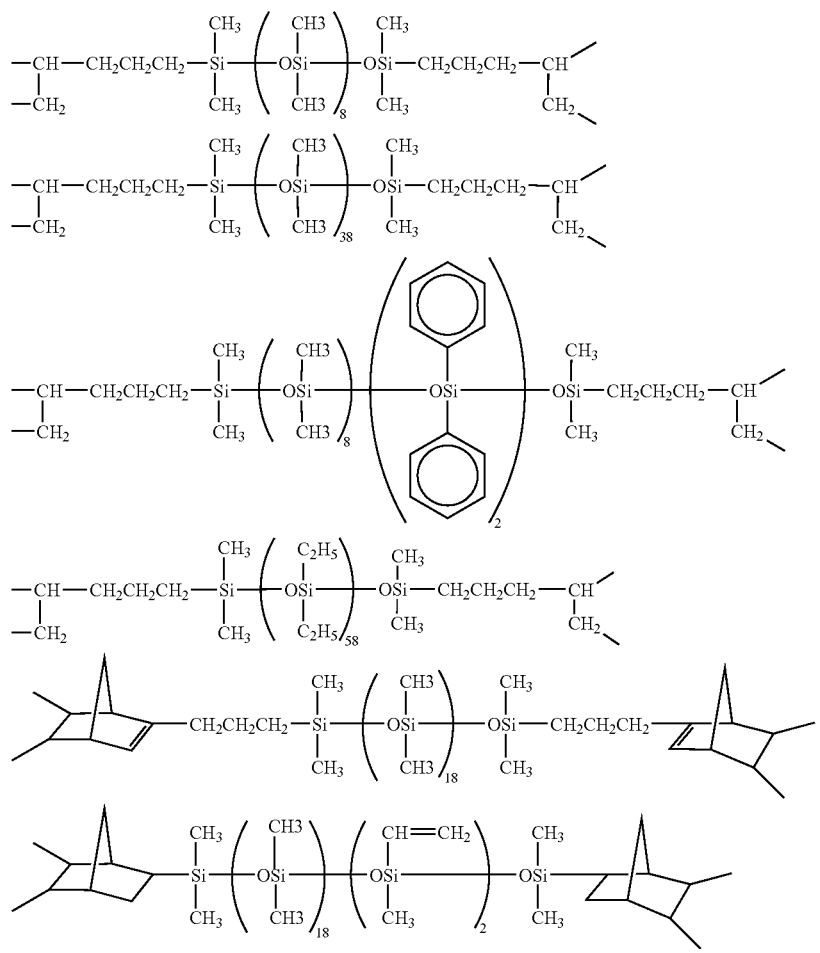

The aforesaid X can be derived by reacting the aforesaid acid anhydride such as succinic acid anhydride, norbornyl acid anhydride, propylnadic acid anhydride, or phthalic acid anhydride with an organohydrogenpolylsiloxane. Generally, the organohydrogenpolylsiloxane is a mixture of those comprising different degree of polymerized siloxane units, so that an acid anhydride-modified silicone formed by the above reaction is a mixture of silicone having different number of siloxane units. Accordingly, n in the formula (2) is an averaged number of the $SiR^1{}_2O$ unit.

The rest of X, hereinafter referred to as W, may be a known tetravalent group such as the groups as shown below.

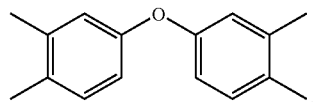

-continued

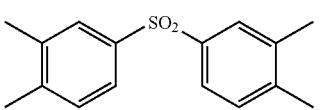

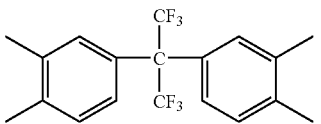

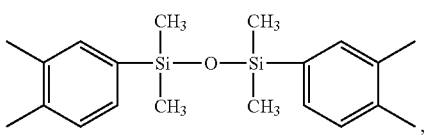

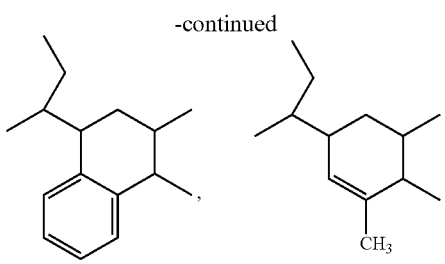

In the formula (1), Y is a divalent organic group. At least one of the divalent organic groups comprises a phenolic hydroxyl group or a carboxyl group bonded to an aromatic ring. Preferably, Y is represented by the following formula (3):

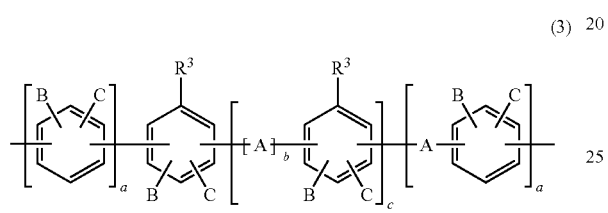

(3)

wherein A is selected from the following divalent organic groups which may be different from each other,

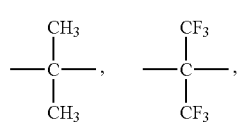 , 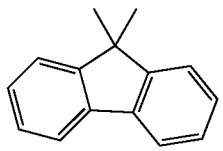

a is 0 or 1, b is 0 or 1, c is an integer of from 0 to 10; B and C are selected from hydrogen atom and alkyl groups having 1 to 4 carbon atoms such as methyl, ethyl, propyl, and butyl groups, among which hydrogen atom and methyl group are preferred because of availability of corresponding raw materials; $R^3$ is a hydroxyl group or a carboxyl group.

Examples of the group represented by the above formula (3) are as shown below.

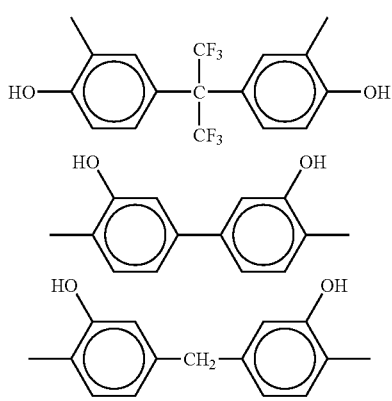

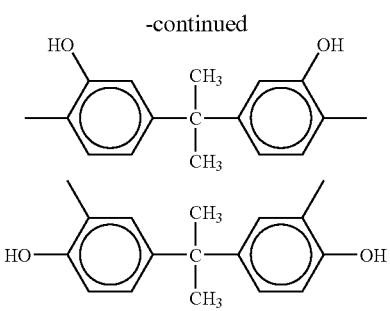

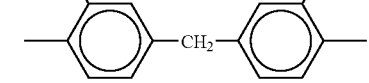
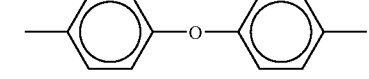
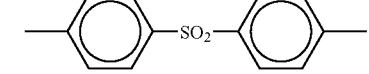
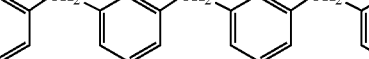
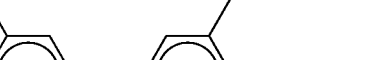
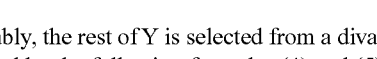
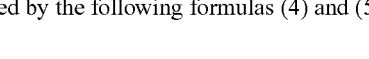

Preferably, the rest of Y is selected from a divalent groups represented by the following formulas (4) and (5):

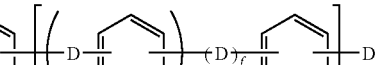
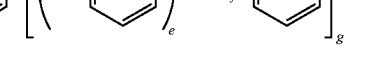
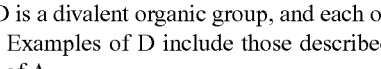
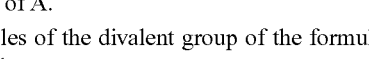

(4)

wherein D is a divalent organic group, and each of e, f and g is 0 or 1. Examples of D include those described above as examples of A.

Examples of the divalent group of the formula (4) are as shown below.

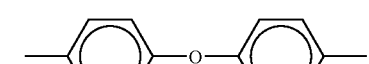

In the formula (5) as shown below,

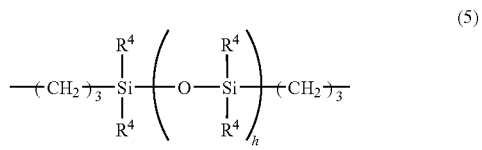

(5)

$R^4$ may be the same with or different from each other and is a monovalent hydrocarbon group having 1 to 8 carbon atoms. Examples of $R^4$ include alkyl groups such as methyl, ethyl, propyl, butyl, pentyl and hexyl groups; alicyclic groups such as cyclopentyl, and cyclohexyl groups; aryl groups such as a phenyl group; aralkyl groups such as benzyl, and phenetyl groups; alkenyl groups such as vinyl, allyl, propenyl, isopropenyl, and butenyl groups; and a mixture thereof. Among these, methyl, ethyl, phenyl and vinyl groups are preferred because of availability of corresponding raw materials. In the formula (5), h is an integer of from 1 to 80, preferably from 3 to 70, more preferably from 5 to 50.

The present polyimide silicone resin has a number average molecular weight determined by gel permeation chromatography (GPC) ranges from 5,000 to 200,000, preferably from 8,000 to 100,000. A polyimide silicone resin having a molecular weight smaller than the aforesaid lower limit tends to form a cured coating which is not mechanically strong. A polyimide silicone resin having a molecular weight larger than the aforesaid upper limit is difficult to dissolve in a solvent and may cause difficulty in handling.

Preferably, the present polyimide silicone is composed of two kinds of repeating units of the following formulas:

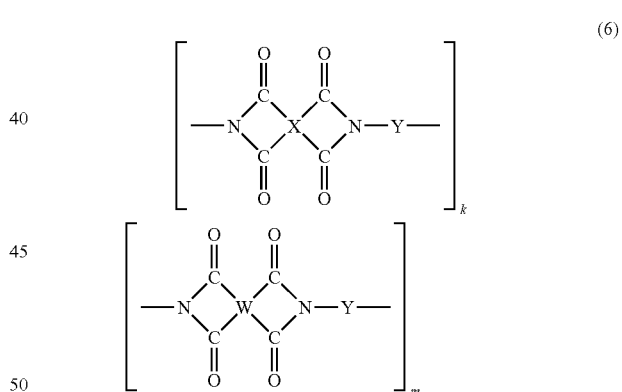

(6)

In the formula (6), X, Y and W are as defined above, k and m are positive integers with k/(k+m) being 0.01 or larger. A sum of k and m are such a number that a number average molecular weight of the polyimide silicone falls in the aforesaid range. Typically, k ranges from 3 to 400 and m ranges of from 0 to 400. These repeating units may form a block copolymer or a random copolymer.

A ratio of repeating unit comprising X to a total repeating units, i.e., k/(k+m), is 0.01 or larger, preferably 0.2 or larger, more preferably 0.5 or larger. If the ratio is below 0.01, sufficient flexibility of a cured product may not be attained. An upper limit of k is theoretical value, i.e., 1.0.

The present polyimide silicone can be prepared by reacting a diamine comprising a phenol moiety and/or an aromatic carboxyl moiety to derive Y of the formula (1) with an acid anhydride-modified silicone to derive X, and, if desired, an acid anhydride to derive W as well as a diamine and/or diaminosilicone which comprises neither a phenolic hydroxyl group nor an aromatic carboxyl group to form a polyamic acid; Then, heating the polyamic acid to a temperature of from 80 to 200° C., preferably from 140 to 180° C., or adding a mixture of acetic anhydride and pyridine to a solution of the polyamic acid, and then heating the resulting solution to a temperature of about 50° C. to cause dehydration cyclization between an acid group and an amide group of the polyamic acid.

Examples of the diamine comprising a phenolic hydroxyl group and/or a carboxyl group include
3,3'-diamino-4,4'-dihydroxylbiphenyl,
2,2-diamino-4,4'-dihydroxybiphenyl,
2,2-bis(4-amino-3-hydroxylphenyl)propane,
2,2-bis(3-amino-4-hydroxylphenyl)propane,
9,9-bis(3-amino-4-hydroxylphenyl)fluorene,
2,2'-methylenebis[6-(4-amino-3,5-dimethylbenzyl)-4-methyl]phenol,
3,3'-diamino-4,4'-dihydroxydiphenylether,
2,2-bis(3-amino-4-hydroxylphenyl)hexafluoropropane,
3,5-diaminobenzoic acid,
2,4-diaminobenzoic acid,
3,3'-dicarboxyl-4,4'-diaminodiphenylmethane,
4,4'-diaminobiphenyl-3,3'-dicarboxylic acid,
4,4'-diaminobiphenyl-2,2'-dicarboxylic acid, and
3,3'-dicarboxyl-4,4'-diaminodiphenylether.

Examples of the acid anhydride-modified silicone to derive X are those having terminal acid anhydride groups bonded to moieties illustrated above as examples of X.

Examples of the acid dianhydride to drive W include
3,3',4,4'-diphenylsulphonetetracarboxylic dianhydride,
3,3',4,4'-biphenyltetracarboxylic dianhydride,
2,3',3,4'-biphenyltetracarboxylic dianhydride,
5-(2,5-dioxotetrahydro-3-furanyl)-3-methyl-3-cyclohexene-1,2-dicarboxyl dianhydride,
4-(2,5-dioxotetrahydrofuran-3-yl)-1,2,3,4-tetrahydronaphthalene-1,2-dicarboxylic dianhydride,
1,2,3,4-butanetetracarboxylic dianhydride,
3,3',4,4'-benzophenonetetracarboxylic dianhydride,
4,4'-hexafluoropropylidenebisphthalic dianhydride,
2,2-bis(p-trimethoxyphenyl)propane,
1,3-tetramethyldisiloxanebisphthalic dianhydride, and
4,4'-oxydiphthalic dianhydride.

Examples of the diamine having neither a phenolic hydroxyl group nor a carboxyl group include
4,4'-diaminobenzanilide,
4,4'-diaminodiphenylether,
3,4'-diaminodiphenylether,
4,4'-diaminodiphenylsulphone,
3,3'-dimethyl-4,4'-diaminobiphenyl,
4,4'-(p-phenylenediisopropylidene)dianiline,
4,4'-(m-phenylenediisopropylidene)dianiline,
1,3-bis(4-aminophenoxy)benzene,
1,4-bis(4-aminophenoxy)benzene,
1,3-bis(3-aminophenoxy)benzene,
2,2-bis[4-(4-aminophenoxy)phenyl]propane,
2,2-bis[4-(4-aminophenoxy)phenyl]hexafluoropropane,
bis[4-(4-aminophenoxy)phenyl]sulphone,
bis[4-(3-aminophenoxy)phenyl]sulphone,
4,4'-bis(4-aminophenoxy)biphenyl, and
9,9-bis(4-aminophenyl)fluorene.

In the preparation of the polyamic acid, a ratio of the diamine component to the tetracarboxylic dianhydride component may be determined according to an intended molecular weight of the polyimide and, in general, may range from 0.95 to 1.05, typically from 0.98 to 1.02. In order to control the molecular weight of the polyimide, it is possible to add a mono-functional acid anhydride such as phthalic anhydride or a mono-functional amine compound, such as aniline. In this case, the mono-functional compound may preferably be added in an amount of 10 mole % or less, relative to the tetracarboxylic dianhydride component or the diamine component.

The reaction of the diamine with the acid dianhydride is generally carried out in a solvent. As the solvent, any solvent that can dissolve the polyimide may be used. Examples of the solvent, mention may be made of ehters such as tetrahydrofuran and anisole; ketones such as cyclohexanone, 2-butanone, methylisobutylketone, 2-heptanone, 2-octanone, and acetophenone; esters such as butyl acetate, methyl benzoate, and γ-butyrolactone; cellosolve acetates, such as butylcellosolve acetate, and propyleneglycol monomethylether acetate; amides, such as N,N-dimethylformamide, N,N-dimethylacetamide, and N-methyl-2-pyrrolidone; and aromatic hydrocarbons, such as toluene and xylene. Preferred are ketons, esters, and cellosolves, particularly γ-butyrolactone, propyleneglycol monomethylether acetate, N,N-dimethylacetamide, and N-methyl-2-pyrrolidone. These solvents may be used alone or in combination of two or more of the solvents. Usually, the concentration of the polyimide is controlled in a range of from 10 to 40 weight %, taking account of a yield per batch and a solution viscosity.

The polyimide resin thus obtained comprising a phenol group and/or carboxyl group is used in combination with an epoxy resin to form a protective or electrical insulating coating or cover-lay film for semiconductor devices, multilayer printed wiring board and soldered parts.

Examples of the epoxy resin include phenolnovolac type epoxy resins, cresol novolac type epoxy resins, bisphenol A type epoxy resins such as bisphenol A diglycidyl ether; bisphenol F type epoxy resin such as bisphenol F diglycidyl ether; triphenylmethane type epoxy resins such as triphenylolpropane triglycidylether; aliphatic cyclic epoxy resin such as 3,4-epoxycyclohexylmethyl-3,4-epoxycyclohexane carboxylate; glycidyl ester resins such as diglycidyl phthalate diglycidylhexahydrophthalate, and dimethylglycidylphthalate; glycidylamine resins such as tetraglycidyldiaminodiphenylmethane, triglycidyl-p-aminophenol, diglycidylaniline, diglycidyltoluidine, and tetraglycidylbisaminomethylcyclohexane.

The epoxy resin is contained in the composition in an amount of from 1 to 300 parts by weight, preferably from 5 to 100 parts by weight per 100 parts by weight of the polyimide silicone resin.

A curing accelerator may be incorporated in the composition to promote reaction of the epoxy resin. Examples of the curing accelerator include organic phosphine compounds such as triphenylphosphine, and tricyclohexylphosphine; amine compounds such as trimethylhexamethylenediamine, diaminodiphenylmethane, 2-(dimethylaminomethyl) phenol, 2,4,6-tris(dimehtylaminoethyl)phenol, and triethanolamine; and imidazol compounds such as 2-methylimidazol, 2-ethylimidazol, 2-phenylimidazol and 2-phenyl-4,5-dihydroxymehtylimidazol.

The curing accelerator is contained in the composition in an amount of at most 10 parts by weight per total 100 parts by weight of the polyimide silicone resin and the epoxy resin. If it is incorporated more than 10 parts by weight, a shelf life of the composition may be shortened.

A solvent may be added to the composition to adjust viscosity or to improve handling property. Any solvent which can dissolve the polyimide silicone and the epoxy resin may be used. Examples of the solvent incude ketones such as tetrahydrofuran, cyclohexanone, cyclopentanone, methylethylketone, and methyl-2-n-amylketone; alcohols such as 3-methoxybutanol, 3-methyl-3-methoxybutanol, 1-methoxy-2-propanol, and 1-ethoxy-2-propanol; ethers such as diglyme, γ-butyrolactone, propyleneglycol monomethylether, ethyleneglycol monomethylether, propyleneglycol monoethylether, ethyleneglycol monoethylether, propyleneglycol dimehtylether, and diethyleneglycol dimehtylether; esters such as propyleneglycol monomethylether acetate, propyleneglycol monoethylether acetate, ethyl lactate, ethyl pyruvate, butyl acetate, methyl 3-methoxypropionate, ethyl 3-methoxypropionate, tert-butyl acetate, tere-butyl propionate, propyleneglycol mono-tert-butylether acetate; amides such as N-methyl-2-pyrolidone and N,N-dimethylacetamide; and a mixture thereof.

The aforesaid organic solvent may be contained in the composition in an amount of from 50 to 2,000 parts by weight, preferably from 100 to 1,000 parts by weight per total 100 parts by weight of the polyimide silicone resin and the epoxy resin. If it is contained below the aforesaid lower limit, the components may not be thoroughly dissolved. If it is contained more than the aforesaid upper limit, a viscosity of such composition may be too low to apply to a substrate.

The present composition can be prepared by mixing the polyimide silicone resin of the present invention, the epoxy resin and solvent and conventionally used additives, if desired, in a known method.

EXAMPLES

The present invention will be explained with reference to the following Examples, but it is not limited thereto.

Example 1

In a flask equipped with a stirrer, a thermometer, and nitrogen purge equipment, were placed 50.2 g (0.05 mole) of 4,4'-oxydiphthalic dianhydride, 51.7 g (0.05 mole) of an acid anhydride-modified siloxane represented by the average compositional formula (7), and 300 g of diglyme, to which 36.6 g (0.1 mole) of 2,2-bis(3-amino-4-hydroxyphenyl) hexafluoropropane was added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added to the reaction mixture. The temperature of the reaction mixture was raised to 150° C., and this temperature was maintained for 6 hours to obtain a brown solution.

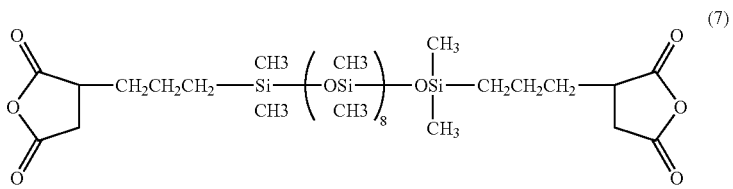

Figure 2:
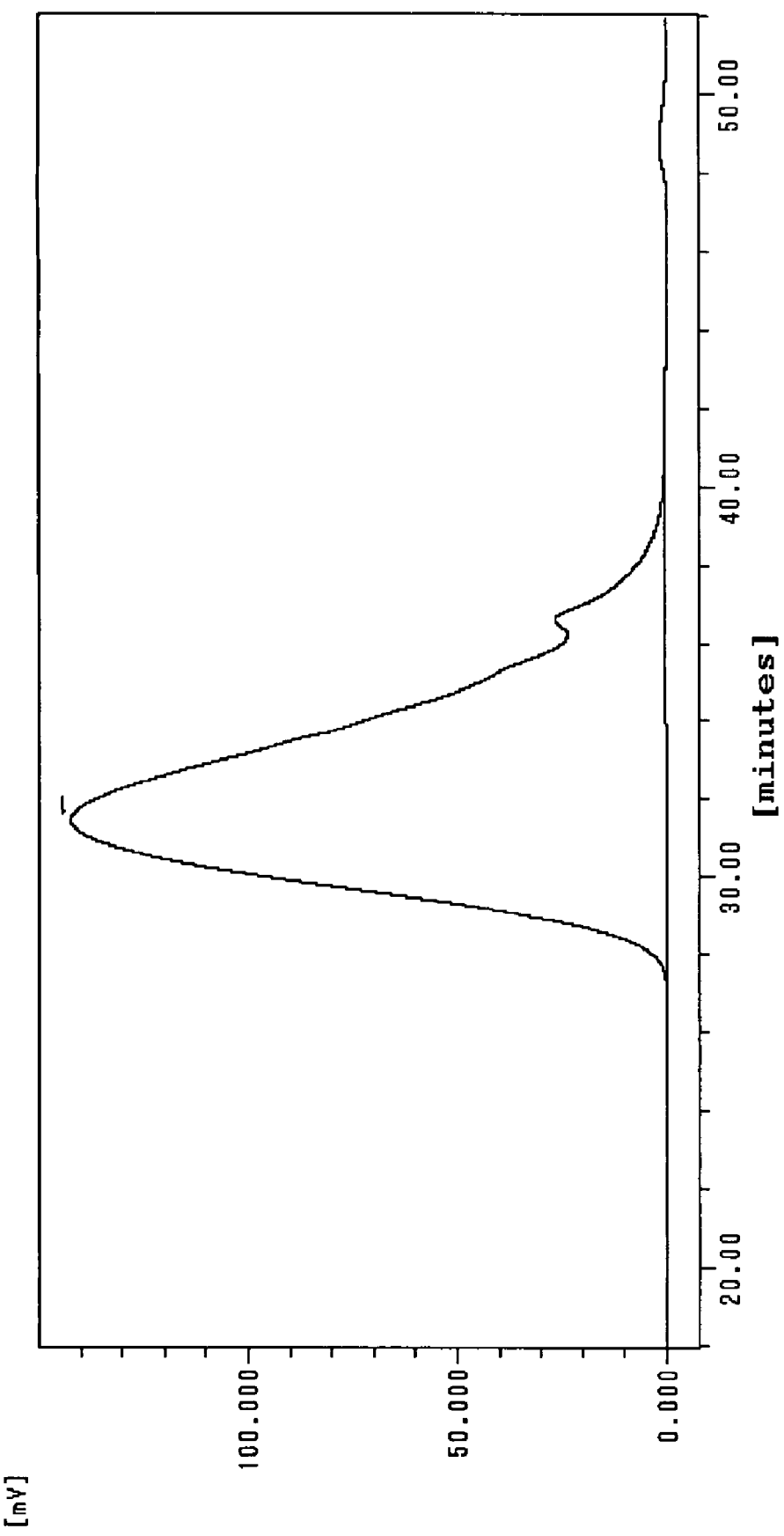
FIG. 2 is a gel permeation chromatogram of the polyimide silicone prepared in Example 1.

The brown solution thus obtained was cooled to room temperature (25° C.) and poured into methanol. The resulting precipitate was isolated by filtration and then dried. A polyimide silicone containing the following repeating units was obtained. The polyimide silicone showed $^1$H NMR spectrum as shown in FIG. 1 and had a number average molecular weight of 36,700, determined from a gel permeation chromatogram as shown in FIG. 2.

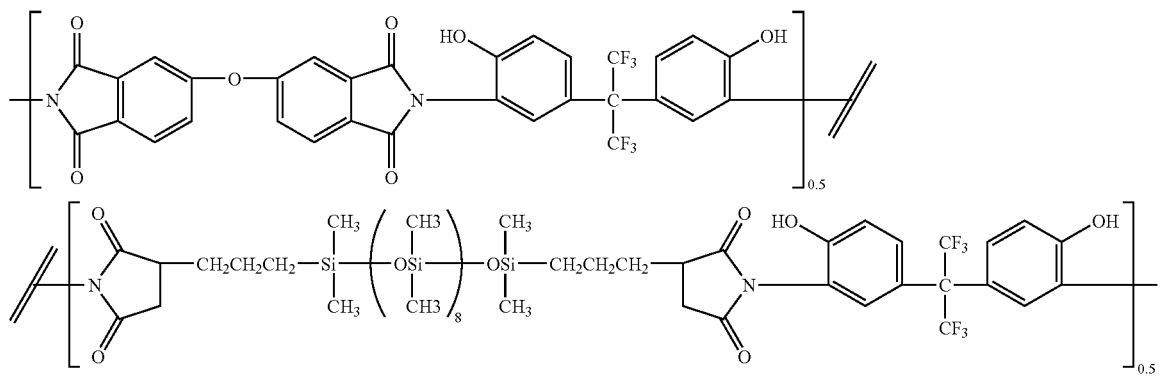

A thermosetting composition was prepared by mixing 100 parts by weight of this polyimide silicone, 30 parts by weight of bisphenol A diglycidyl ether, 0.6 part by weight of 2-ethylimidazol, and 300 parts by weight of cyclohexanone.

Example 2

In a flask equipped with a stirrer, a thermometer, and nitrogen purge equipment, were placed 8.9 g (0.02 mole) of 4,4'-hexafluoropropylidenebisphthalic dianhydride, 80.3 g (0.08 mole) of an acid anhydride-modified siloxane represented by the aforesaid formula (7), and 350 g of N,N-dimethylacetoamide, to which 25.8 g (0.1 mole) of 2,2-bis(3-amino-4-hydroxyphenyl)propane was added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added. The temperature of the reaction mixture was raised to 150° C., and this temperature was maintained for 6 hours to obtain a brown solution.

Figure 3:
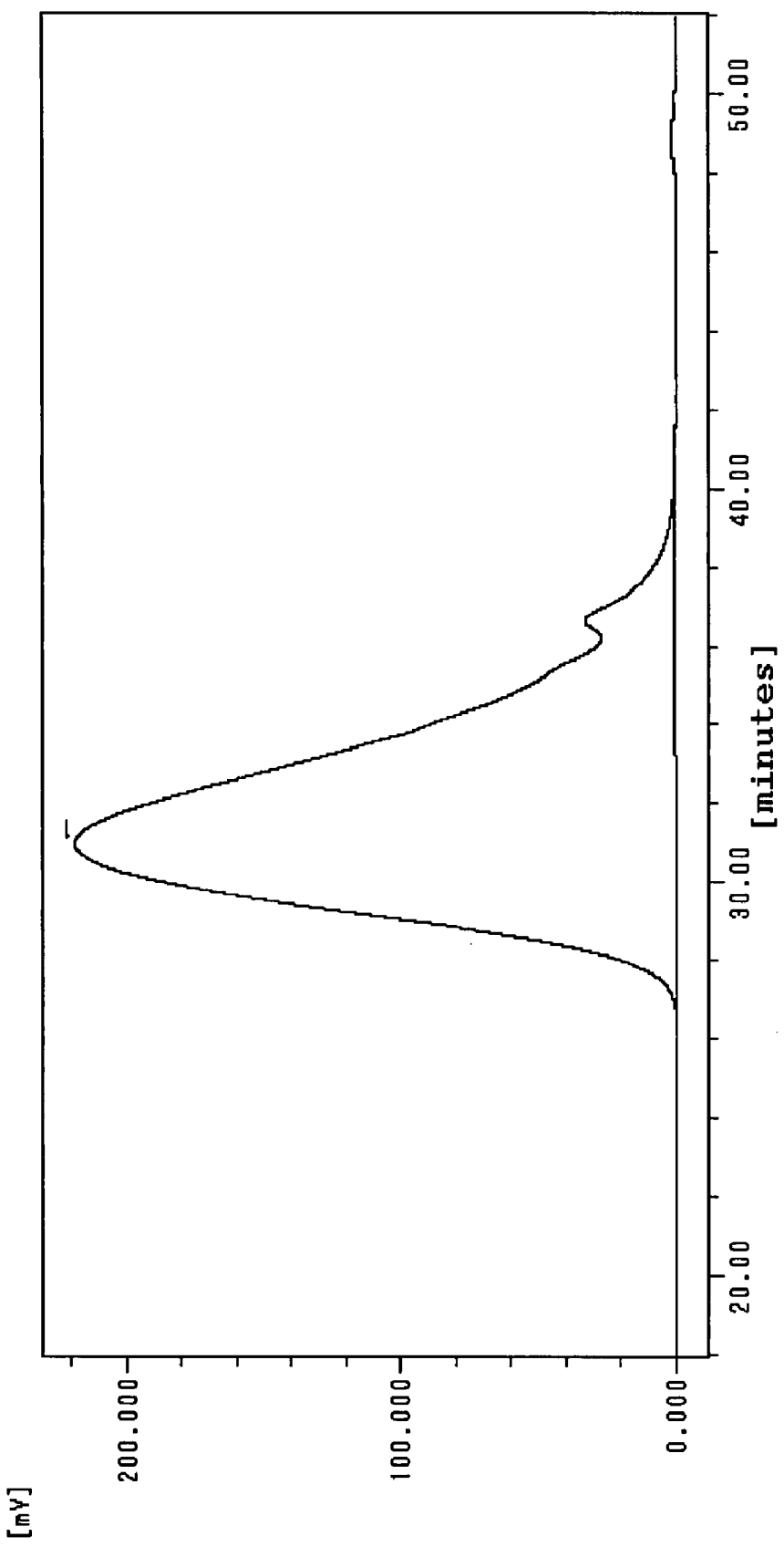
FIG. 3 is a gel permeation chromatogram of the polyimide silicone prepared in Example 2.

The brown solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 33,000, determined from a gel permeation chromatogram as shown in FIG. 3.

A thermosetting composition was prepared by mixing 100 parts by weight of this polyimide silicone, 27 parts by weight of diglycidyl toluidine, and 300 parts by weight of cyclohexanone.

Example 3

In a flask equipped with a stirrer, a thermometer, and nitrogen purge equipment, were placed 17.9 g (0.05 mole) of 3,3',4,4'-diphenylsulfone tetracarboxylic acid dianhydride, and 450 g of diglyme, to which 8.2 g (0.02 mole) of 2,2-bis[4-(4-aminophenoxy)phenyl]propane was added and stirred at room temperature for 1 hour. Then, 87.2 g (0.05 mole) of the acid anhydride-modified siloxane of the following formula (8) was added, to which 29.3 g (0.08 mole) of 2,2-bis(3-amino-4-hydroxyphenyl)hexafluoropropane was added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added. The temperature of the reaction mixture was raised to 150° C., and this temperature was maintained for 6 hours to obtain a brown solution.

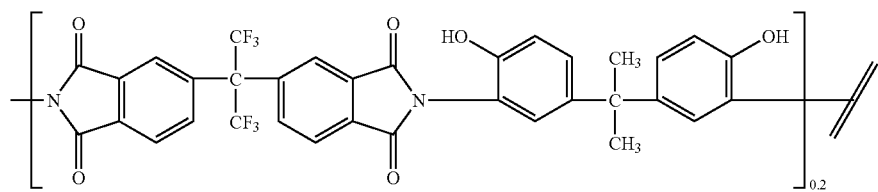

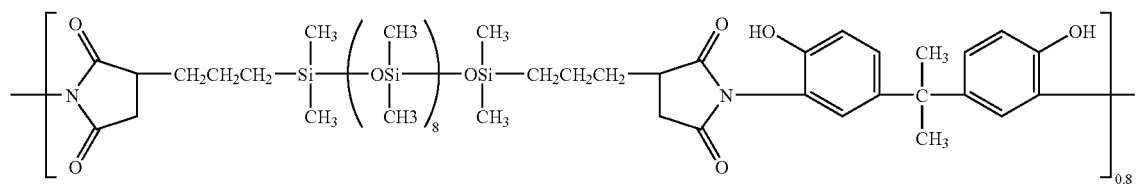

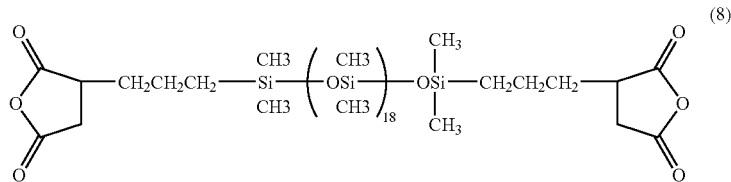

Figure 4:
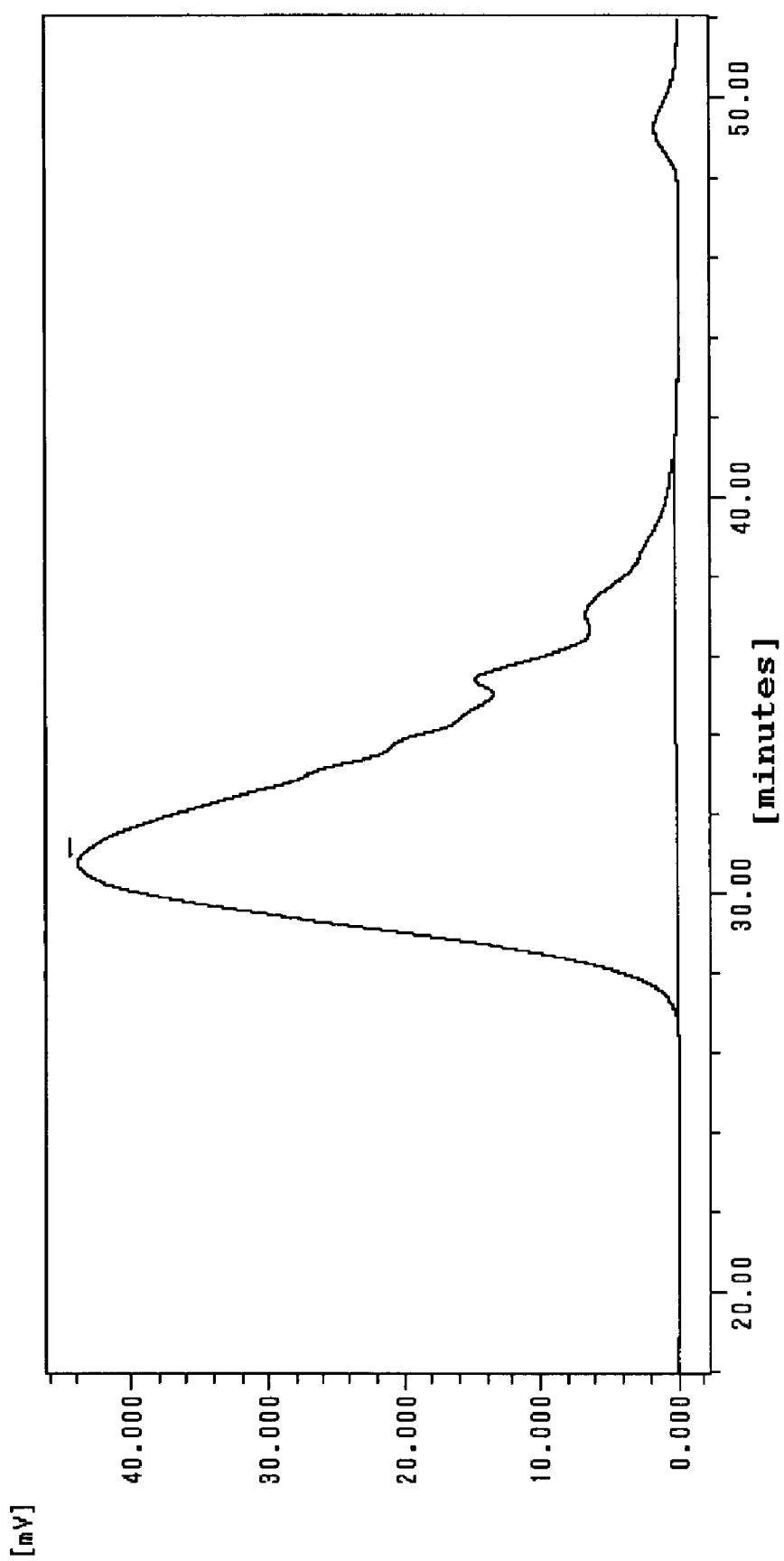
FIG. 4 is a gel permeation chromatogram of the polyimide silicone prepared in Example 3.

The brown solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 29,000, determined from a gel permeation chromatogram as shown in FIG. 4.

droxyphenyl)hexafluoropropane and, then, 21 g (0.025 mole) of an diamine having terminal amino groups bonded to the siloxane moiety represented by the aforesaid formula (5), wherein $R^3$ is a methyl group and h is 8 on average, were added in such a manner that a temperature of the reaction system did not exceed 50° C. The reaction mixture was stirred

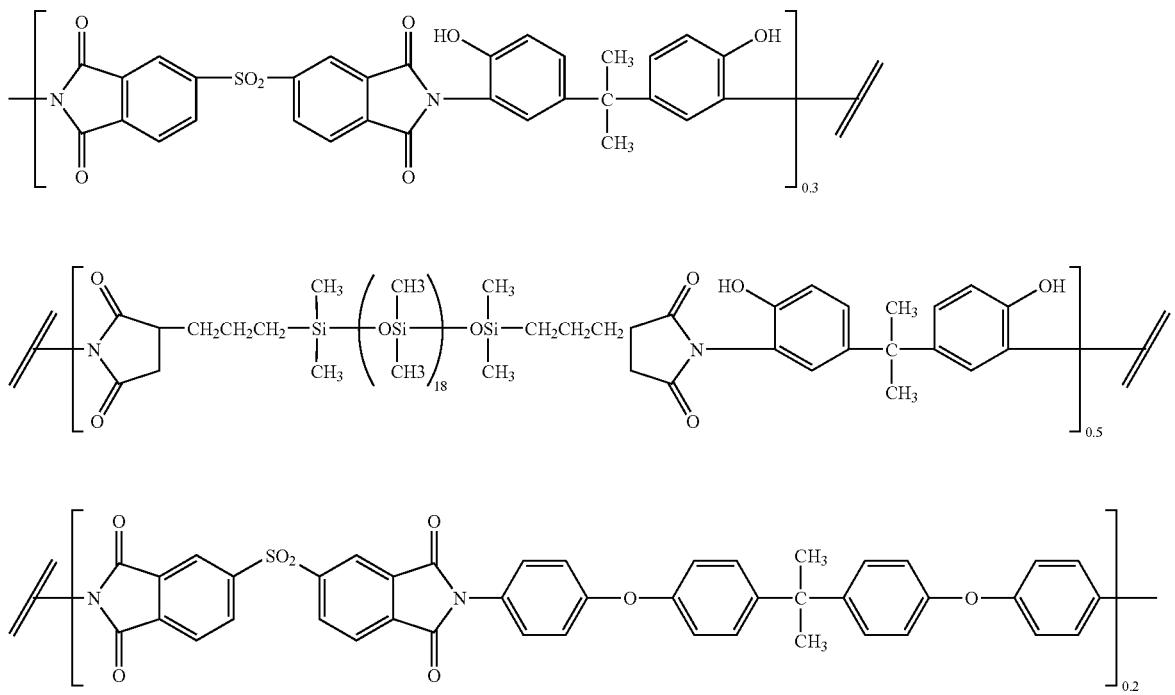

A thermosetting composition was prepared by mixing 100 parts by weight of this polyimide silicone, 24 parts by weight of bisphenol A diglycidyl ether, 0.4 part by weight of 2-ethylimidazol, and 300 parts by weight of cyclohexanone.

Example 4

In a flask equipped with a stirrer, a thermometer, and nitrogen purge equipment, were placed 27.1 g (0.087 mole) of 4,4'-oxydiphthalic dianhydride, 65.4 g (0.0375 mole) of an acid anhydride-modified siloxane represented by the aforesaid average compositional formula (7), and 500 g of diglyme, to which 36.6 g (0.1 mole) of 2,2-bis(3-amino-4-hyat room temperature for 10 hours. Then, a reflux condenser provided with a water receptor was attached to the flask and, subsequently, 150 g of toluene was added. The temperature of the reaction mixture was raised to 150° C., and this temperature was maintained for 6 hours to obtain a yellow solution.

The yellow solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 25,000, determined by GPC.

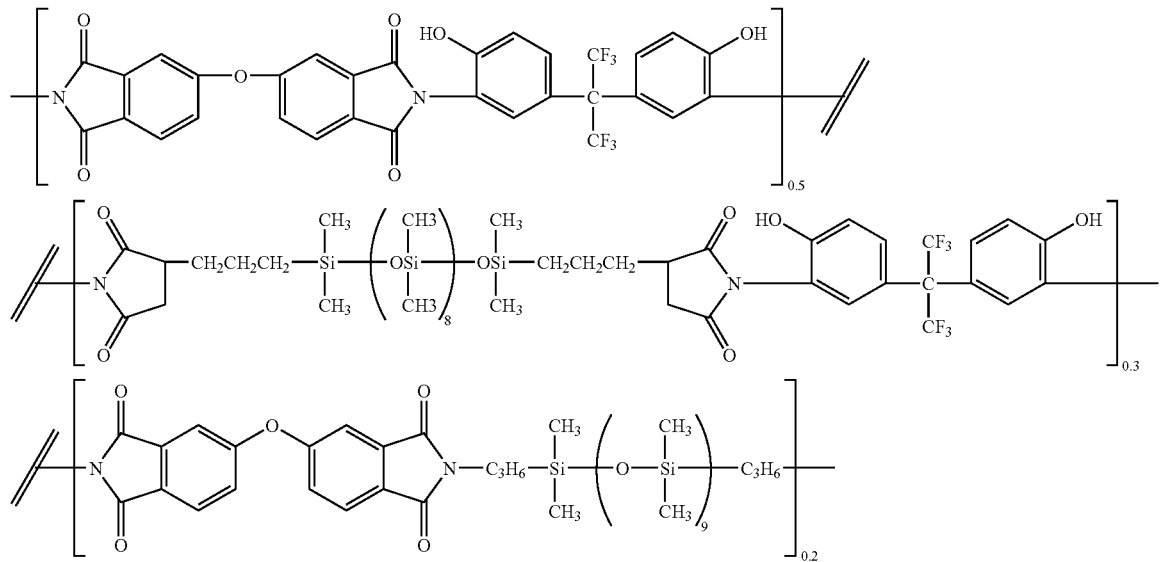

A thermosetting composition was prepared by mixing 100 parts by weight of this polyimide silicone, 20 parts by weight of bisphenol A diglycidyl ether, 0.3 part by weight of 2-ethylimidazol, and 300 parts by weight of cyclohexanone.

Example 5

In a flask equipped with a stirrer, a thermometer, and nitrogen purge equipment, were placed 22.2 g (0.05 mole) of 4,4'-hexafluoropropylidenebisphthalic dianhydride, 114.2 g (0.117 mole) of an acid anhydride-modified siloxane represented by the aforesaid formula (7), and 450 g of N,N-dimethylacetoamide, to which 47.7 g (0.167 mole) of 2,2-bis(3-carboxy-4-aminophenyl)methane was added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added. The temperature of the reaction mixture was raised to 150° C., and this temperature was maintained for 6 hours to obtain a brown solution.

The brown solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 19,000, determined by GPC.

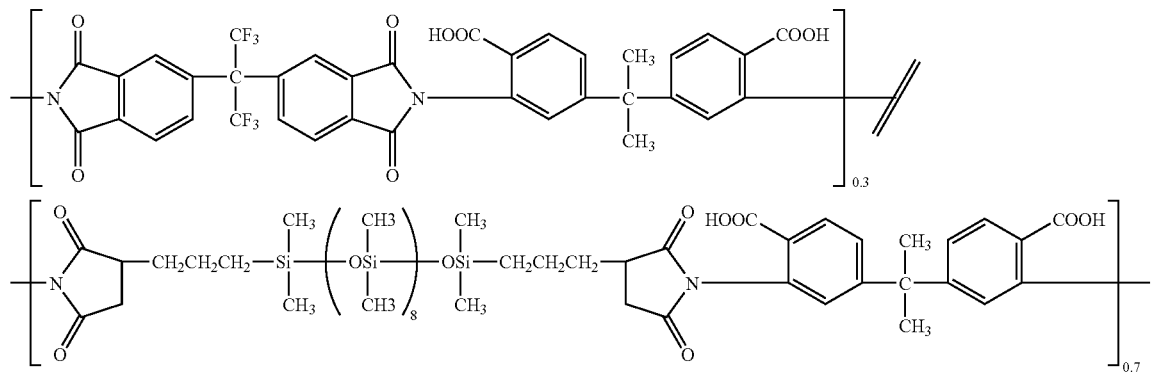

A thermosetting composition was prepared by mixing 100 parts by weight of this polyimide silicone, 20 parts by weight of bisphenol A diglycidyl ether, 0.3 part by weight of 2-ethylimidazol, and 300 parts by weight of cyclohexanone.

Comparative Example 1

In a flask equipped with a stirrer, a thermometer, and nitrogen purge equipment, were placed 44.4 g (0.1 mole) of 4,4'-hexafluoropropylidenebisphthalic dianhydride and 350 g of diglyme, to which 5.2 g (0.02 mole) of 2,2-bis(3-amino-4-hydroxyphenyl)propane and 67.2 g (0.08 mole)diaminosiloxane having terminal amino groups bonded to the siloxane moiety represented by the aforesaid formula (5), wherein $R^3$ is a methyl group and h is 8 on average, were added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added. The temperature of the reaction mixture was raised to 150° C., and this temperature was maintained for 6 hours to obtain a brown solution.

Figure 5:
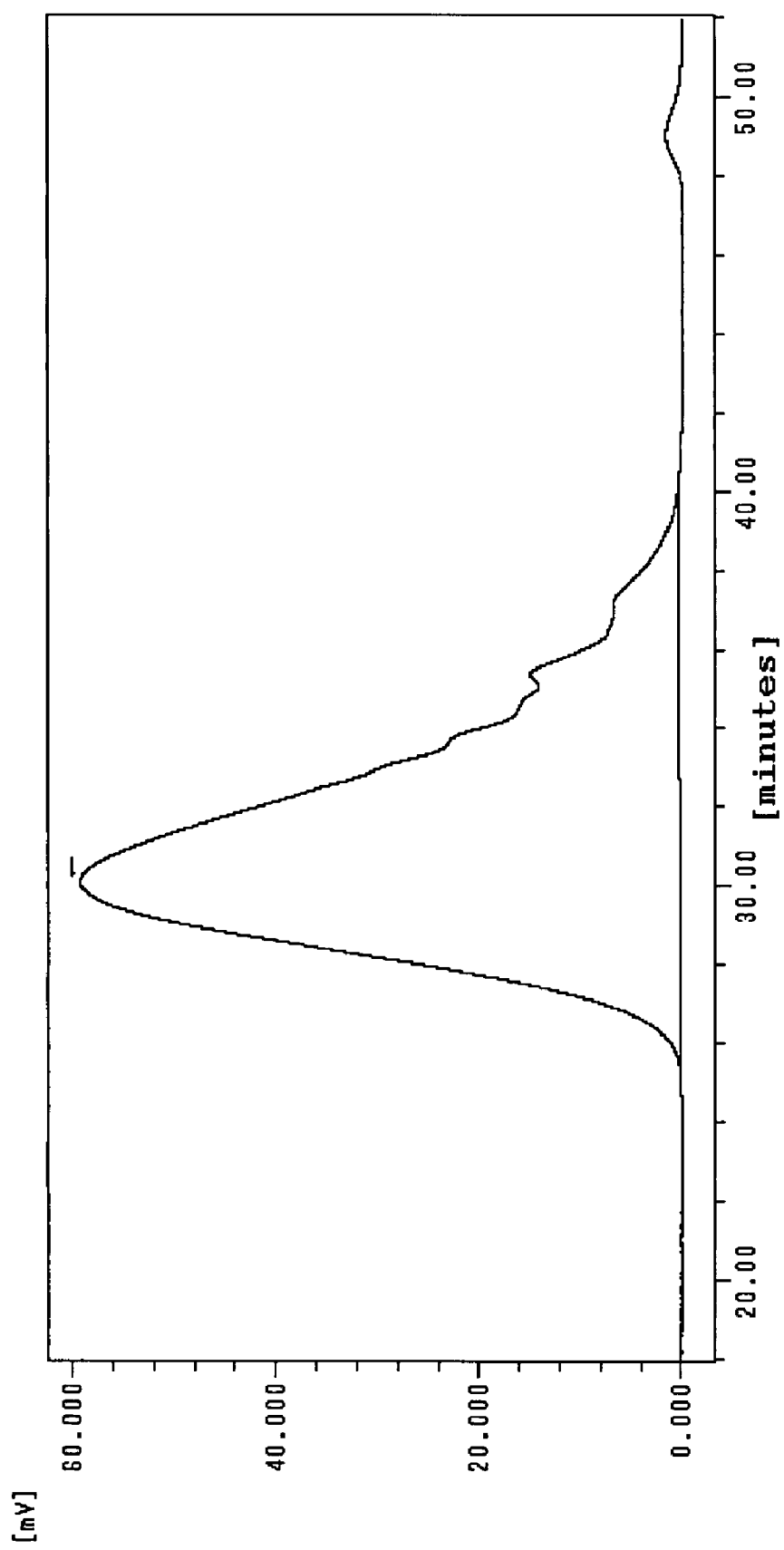
FIG. 5 is a gel permeation chromatogram of the polyimide silicone prepared in Comparative Example 1.

The brown solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 41,500, determined from a gel permeation chromatogram as shown in FIG. 5.

diglyme, to which 5.2 g (0.02 mole) of 2,2-bis(3-amino-4-hydroxyphenyl)propane and 67.2 g (0.08 mole) diaminosiloxane having terminal amino groups bonded to the siloxane moiety represented by the aforesaid formula (5), wherein $R^3$ is a methyl group and h is 8 on average, were added in such a manner that a temperature of the reaction system did not exceed 50° C. The reaction mixture was stirred at room temperature for 10 hours. Then, a reflux condenser provided with a water receptor was attached to the flask and, subsequently, 100 g of toluene was added. The temperature of the reaction mixture was raised to 150° C., and this temperature was maintained for 6 hours to obtain a brown solution.

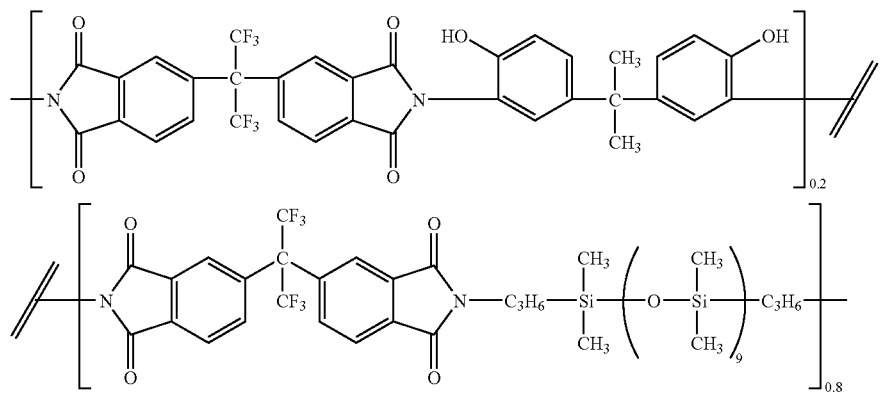

A thermosetting composition was prepared by mixing 100 parts by weight of this polyimide silicone, 6 parts by weight of bisphenol A diglycidyl ether, 0.3 part by weight of 2-ethylimidazol, and 300 parts by weight of cyclohexanone.

Comparative Example 2

Figure 6:
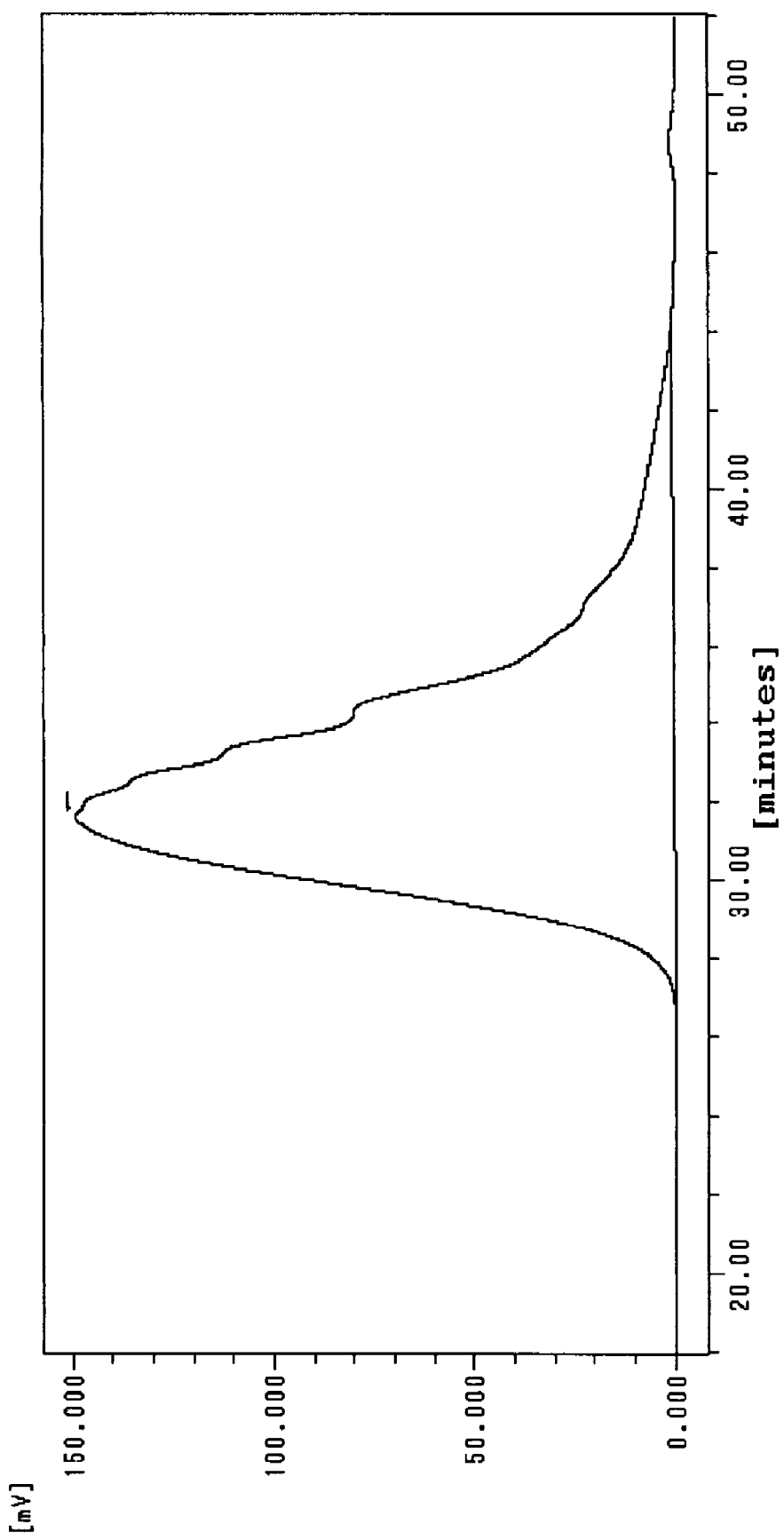
FIG. 6 is a gel permeation chromatogram of the polyimide silicone prepared in Comparative Example 2.

In a flask equipped with a stirrer, a thermometer, and nitrogen purge equipment, were placed 44.4 g (0.1 mole) of 4,4'-hexafluoropropylidenebisphthalic dianhydride, and 300 g of The brown solution thus obtained was cooled to room temperature (25° C.) and poured into methanol. The resulting precipitate was isolated by filtration and then dried. A polyimide silicone containing the following repeating units was obtained. The polyimide silicone had a number average molecular weight of 19,000, determined from a GPC chromatogram as shown in FIG. 6.

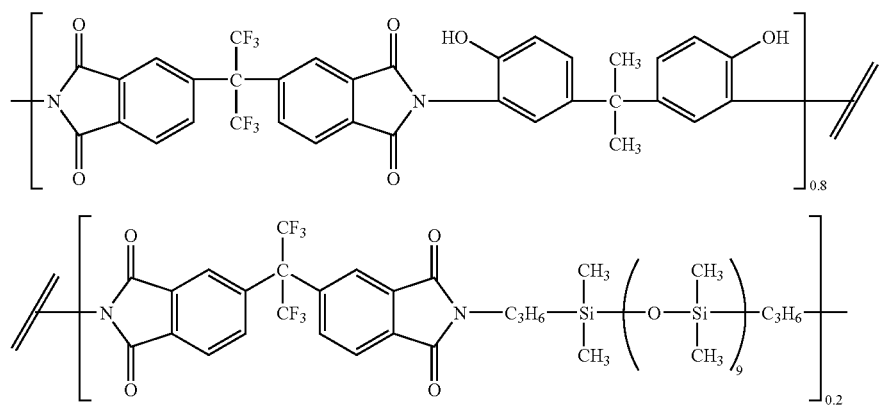

A thermosetting composition was prepared by mixing 100 parts by weight of this polyimide silicone, 24 parts by weight of diglycidyl toluidine, and 300 parts by weight of cyclohexanone.

Functional Group Equivalent Amount

A functional group equivalent (g/mole), i.e., a molecular weight per mole of phenolic hydroxyl group or carboxyl group of each polyimide resin was determined by quantitating protons of these groups in H-NMR spectra.

Siloxane Content

A siloxane content of each polyimide resin was calculated according to the following equation:

A siloxane content (wt %)=a weight of a siloxane component in raw materials for a polyimide/a total weight of the raw materials Preparation of a Cured Coating A polyimide silicone composition was applied in a thickness of 20 μm on a cupper substrate and, then, heated at 80° C. for 30 minutes followed by heating at 180° C. for 1 hour to cure the composition.

Solvent Resistance

A copper substrate with a cured coating thereon was soaked in N-methyl-2-pyrrolidone for 10 minutes. Then, the substrate was taken out and a surface of the cured coating was inspected for damage.

Adhesion

A copper substrate with a cured coating thereon was kept in an environment of saturated moisture at 2.1 atm for 96 hours. The cured coating was then subjected to a scratch test according to Japanese Industrial Standard K5400. In Table 1, a number of peeled section per 100 sections is indicated. For example, 0/100 indicates no section was scratched off and 100/100 indicates all the sections were scratched off.

Substrate Warpage

A polyimide silicone resin composition was applied in a thickness of 20 μm on a 10 cm×10 cm polyimide film, Kapton, ex DuPont, having a thickness of 25 μm. The applied composition was heated at 80° C. for 30 minutes and then 180° C. for 1 hour. Then, the polyimide film with cured coating thereon was inspected for warpage.

TABLE 1

| | Resistance to N-methyl-2-pyrrolidone | Adhesion (scratch test) | Warpage | Siloxane content (wt %) | Functional group equivalent (g/mol) |
|---|---|---|---|---|---|
| Example 1 | No damage | 0/100 | None | 36 | 485 |
| Example 2 | No damage | 0/100 | None | 63 | 550 |
| Example 3 | No damage | 0/100 | None | 55 | 600 |
| Example 4 | No damage | 0/100 | None | 57 | 727 |
| Example 5 | No damage | 0/100 | None | 62 | 550 |
| Comparative Example 1 | swollen | 15/100 | None | 51 | 2915 |
| Comparative Example 2 | No damage | 0/100 | Yes | 18 | 510 |

The polyimide resin used in Comparative Examples did not contain a repeating unit comprising both phenolic and silicone moieties. The polyimide resin of Comparative Examples 1 had a large equivalent weight and was not resistant to solvent. The polyimide resin prepared in Comparative Examples 2 had a smaller equivalent weight, but caused substrate to warp. The polyimide silicone resins of Examples, though with similar equivalent weight to that of Comparative Example 2, showed significantly stronger solvent resistance and adhesion strength, and caused no warpage.

The invention claimed is:

1. A polyimide silicone resin, characterized in that the polyimide silicone resin comprises repeating units represented by the following formula (1) and has a number average molecular weight of from 5,000 to 200,000

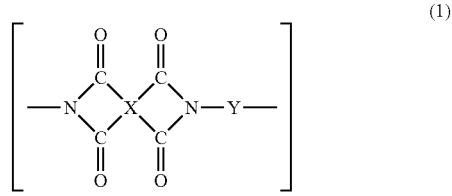

wherein X is a tetravalent organic group, at least one of the tetravalent organic groups being represented by the following formula (2)

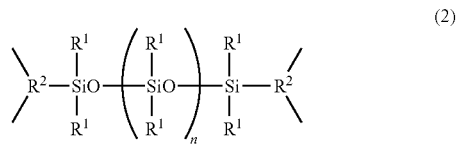

wherein $R^1$ may be the same with or different from each other and is a monovalent hydrocarbon group having 1 to 8 carbon atoms, $R^2$ may be the same with or different from each other and is a trivalent organic group, and n ranges from 1 to 120 on average, and Y is a divalent organic group, wherein 50 mole % or more of Y is the divalent organic group comprising a phenolic hydroxyl group or a carboxyl group bonded to an aromatic ring.

2. The polyimide silicone resin according to claim 1, wherein the divalent organic group, among Y, comprising a phenolic hydroxyl group or a carboxyl group bonded to an aromatic ring is represented by the formula (3):

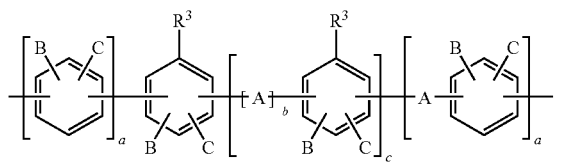

wherein A may be the same with or different from each other and is selected from the following divalent organic groups,

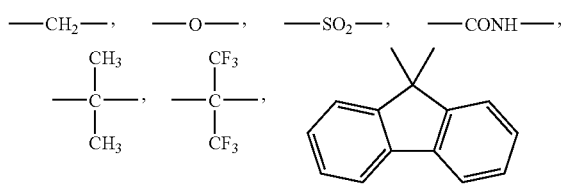

each of B and C is a hydrogen atom or an alkyl group having 1 to 4 carbon atoms, a is 0 or 1, b is 0 or 1, c is an integer of from 0 to 10, and $R^3$ may be the same with or different from each other and is a hydroxyl group or a carboxyl group.

3. The polyimide silicone resin according to claim 1, wherein the rest of Y is at least one selected from the group consisting of a divalent organic group represented by the following formula (4) and a divalent organic group represented by the following formula (5)

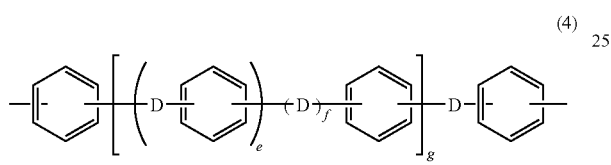

(4)

wherein D may be the same with of different from each other and is selected from the following groups

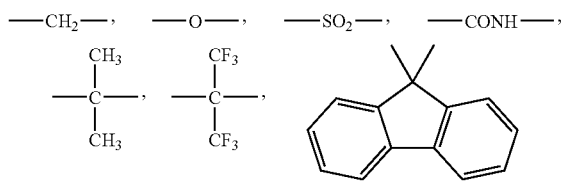

each of e, f and g is 0 or 1;

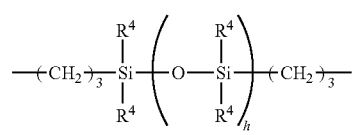

(5)

wherein $R^4$ may be the same with or different from each other and is a monovalent hydrocarbon group having 1 to 8 carbon atoms, and h is an integer of from 1 to 80.

4. The polyimide silicone resin according to claim 1, wherein the rest of X is a tetravalent group, which is referred to as W, selected from the following groups

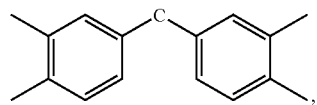

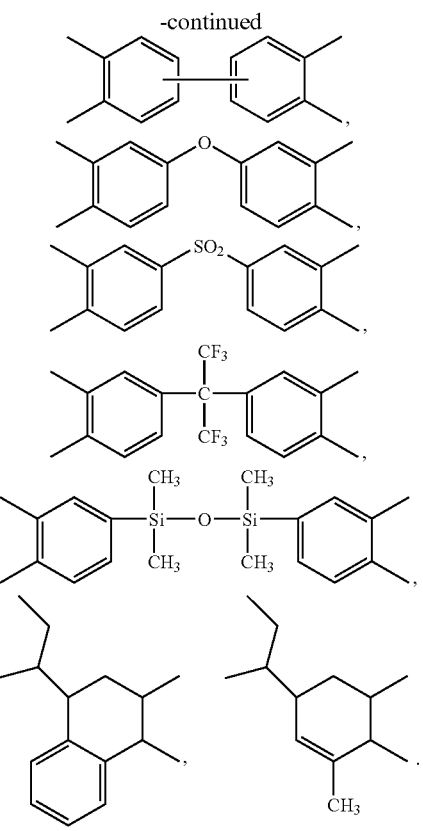

5. The polyimide silicone resin according to claim 4, wherein the polyimide silicone is composed of the repeating units of the following formulas:

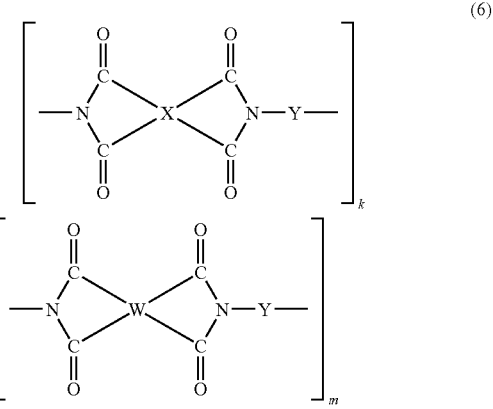

wherein X, Y and W are as defined above, and k and m are positive integers with k/(k+m) being 0.01 or larger.

6. A thermosetting resin composition comprising 100 parts by weight of the polyimide silicone resin according to any one claims 1, 2, 3, 4 and 5, and 1 to 300 parts by weight of an epoxy resin.

7. The polyimide silicone resin according to claim 1, wherein 80 mole % or more of Y is the divalent organic group comprising a phenolic hydroxyl group or a carboxyl group bonded to an aromatic ring.

8. The polyimide silicone resin according to claim 1, wherein X is at least one selected from the group consisting of
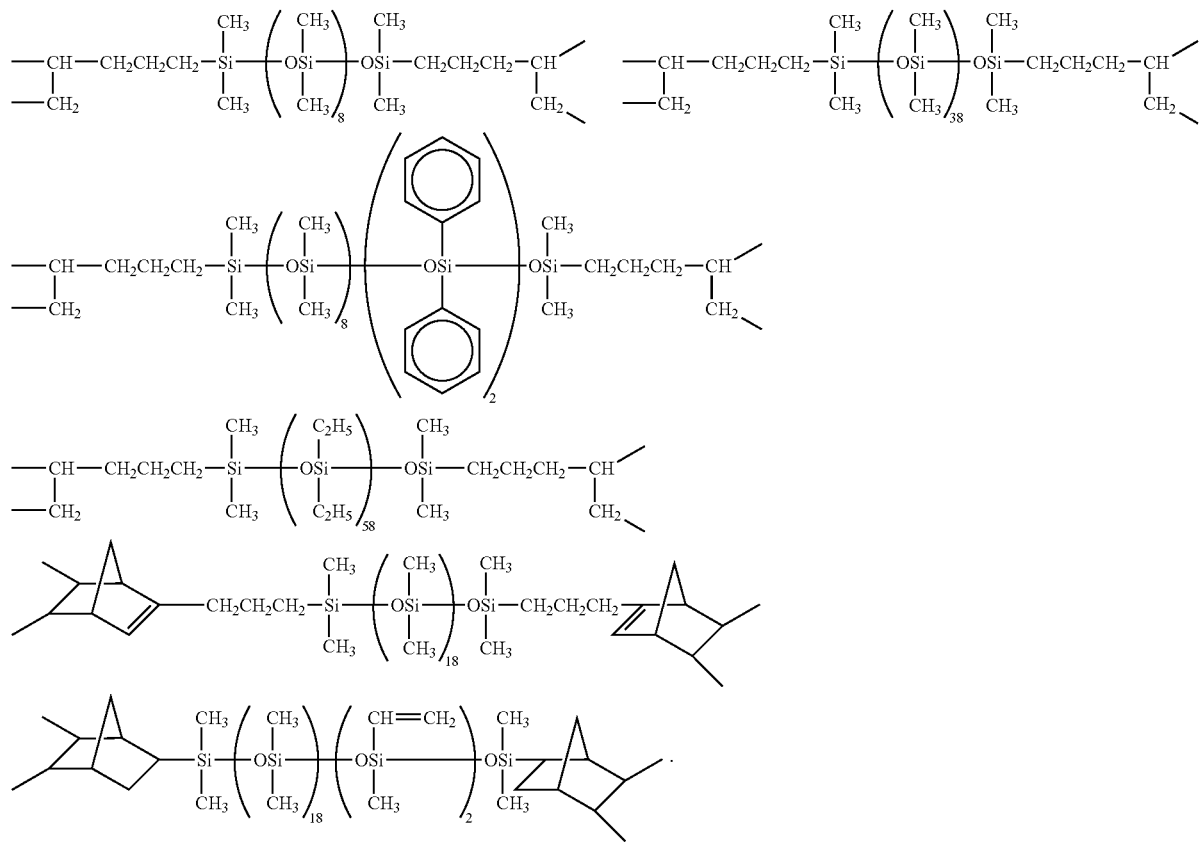
9. The polyimide silicone resin according to claim 2, wherein the divalent organic group represented by formula (3) comprising a phenolic hydroxyl group or carboxyl group bonded to an aromatic ring is selected from the group consisting of
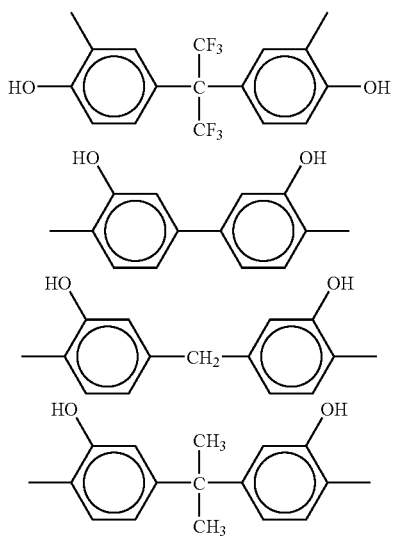
-continued
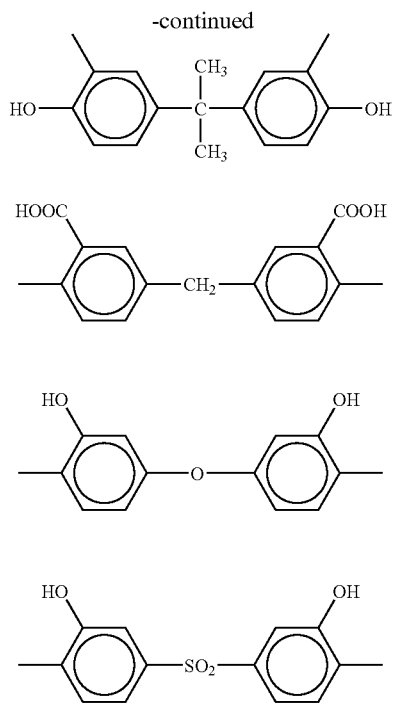

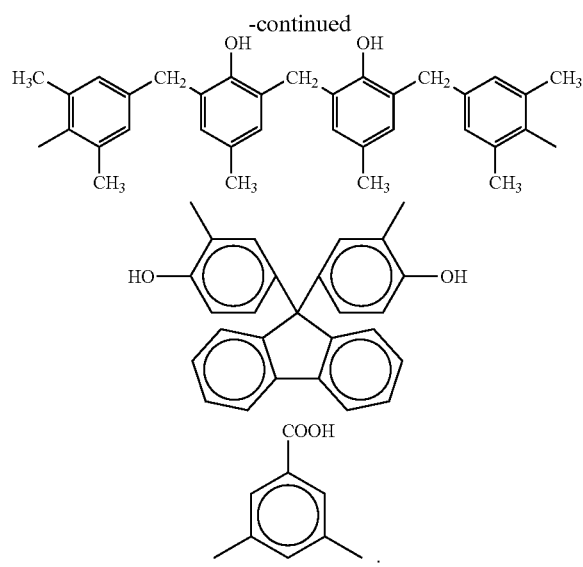

10. The polyimide silicone resin according to claim 3, wherein the rest of Y represented by formula (4) is selected from the group consisting of

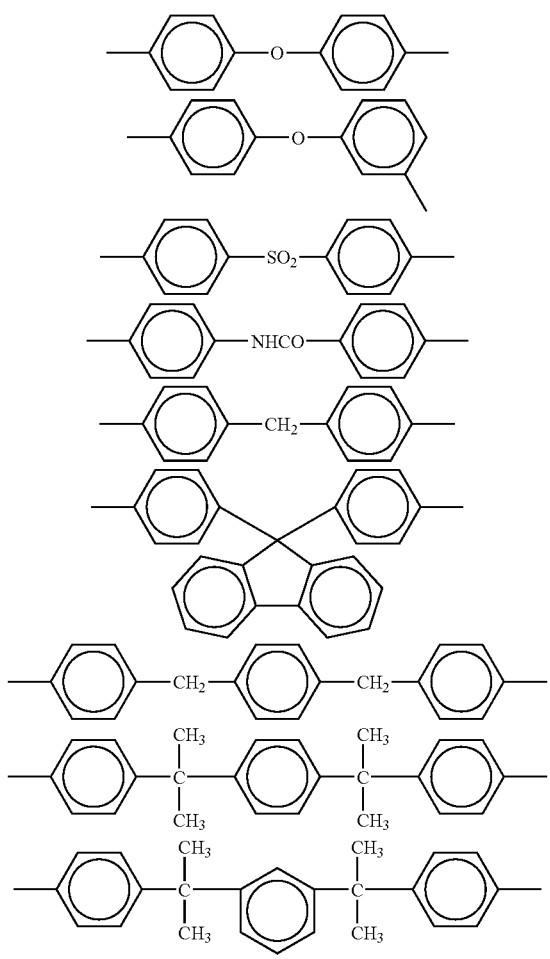

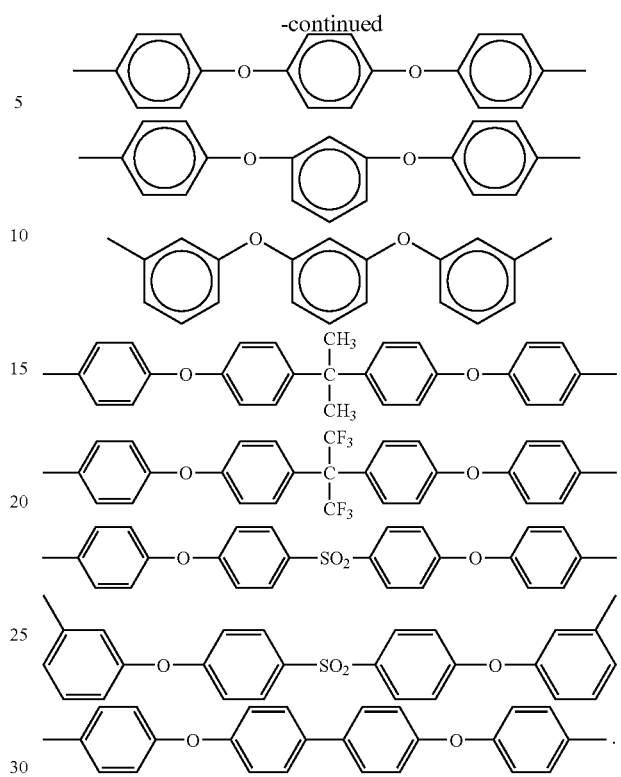

11. The polyimide silicone resin according to claim 1, wherein the divalent organic group of Y comprising a phenolic hydroxyl group or a carboxyl group bonded to an aromatic ring is selected from the group consisting of 3,3'-diamino-4,4'-dihydroxylbiphenyl, 2,2-diamino-4,4'-dihydroxybiphenyl, 2,2-bis(4-amino-3-hydroxylphenyl)propane, 2,2-bis(3-amino-4-hydroxylphenyl)propane, 9,9-bis(3-amino-4-hydroxylphenyl)fluorene, 2,2'-methylenebis[6-(4-amino-3,5-dimethylbenzyl)-4-methyl]phenol, 3,3'-diamino-4,4'-dihydroxydiphenylether, 2,2-bis(3-amino-4-hydroxylphenyl)hexafluoropropane, 3,5-diaminobenzoic acid, 2,4-diaminobenzoic acid, 3,3'-dicarboxyl-4,4'-diaminodiphenylmethane, 4,4'-diaminobiphenyl-3,3'-dicarboxylic acid, 4,4'-diaminobiphenyl-2,2'-dicarboxylic acid, and 3,3'-dicarboxyl-4,4'-diaminodiphenylether.

12. The polyimide silicone resin according to claim 1, wherein the divalent organic group of Y includes a divalent organic group comprising neither a phenolic hydroxyl group nor a carboxyl group bonded to an aromatic ring is selected from the group consisting of 4,4'-diaminobenzanilide, 4,4'-diaminodiphenylether, 3,4'-diaminodiphenylether, 4,4'-diaminodiphenylsulphone, 3,3'-dimethyl-4,4'-diaminobiphenyl, 4,4'-(p-phenylenediisopropylidene)dianiline, 4,4'-(m-phenylenediisopropylidene)dianiline, 1,3-bis(4-aminophenoxy)benzene, 1,4-bis(4-aminophenoxy)benzene, 1,3-bis(3-aminophenoxy)benzene, 2,2-bis[4-(4-aminophenoxy)phenyl]propane, 2,2-bis[4-(4-aminophenoxy)phenyl]hexafluoropropane, bis[4-(4-aminophenoxy)phenyl]sulphone, bis[4-(3-aminophenoxy)phenyl]sulphone, 4,4'-bis(4-aminophenoxy)biphenyl, and 9,9-bis(4-aminophenyl)fluorene.

* * * * *